(12) United States Patent
Miller et al.

(10) Patent No.: US 6,625,639 B1
(45) Date of Patent: Sep. 23, 2003

(54) APPARATUS AND METHOD FOR PROCESSING A TASK IN A CLUSTERED COMPUTING ENVIRONMENT

(75) Inventors: Robert Miller, Rochester, MN (US); Vicki Lynn Morey, Pine Island, MN (US); Kiswanto Thayib, Rochester, MN (US); Laurie Ann Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/438,207

(22) Filed: Nov. 12, 1999

Related U.S. Application Data

(63) Continuation-in-part of application No. 09/421,585, filed on Oct. 20, 1999.

(51) Int. Cl.⁷ .................................................. G06F 9/00
(52) U.S. Cl. ...................... 709/106; 709/100; 709/102; 709/201
(58) Field of Search ............................... 709/100, 105, 709/106, 107, 108, 102, 103, 104, 201, 202, 203

(56) References Cited

U.S. PATENT DOCUMENTS 6,216,150 B1 * 4/2001 Badovinatz et al. ........ 709/106
6,430,591 B1 * 8/2002 Goddard ..................... 709/102

* cited by examiner

*Primary Examiner*—Majid Banankhah
(74) *Attorney, Agent, or Firm*—Martin & Associates, LLC; Derek P. Martin

(57) ABSTRACT

A clustered computer system includes multiple computer systems (or nodes) on a network that can become members of a group to work on a particular task. Each node includes group state data that represents the status of all members of the group. A group state data update mechanism in each node updates the group state data at acknowledge (ACK) rounds, so that all the group state data in all nodes are synchronized and identical if all members respond properly during the ACK round. Each node also includes a main thread and one or more work threads. The main thread receives messages from other computer systems in the group, and routes messages intended for the work thread to either a response queue or a work queue in the work thread, depending on the type of the message. If the message is a response to a currently-executing task, the message is placed in the response queue. Otherwise, the message is placed in the work queue for processing at a later time.

31 Claims, 6 Drawing Sheets

Group State Data — 342

| | | 710 |
|---|---|---|
| Node 1 | Node 1 Status | |
| Node 2 | Node 2 Status | |
| ⋮ | ⋮ | |
| Node n | Node n Status | 720 |

Resource List
Group Resource 1
Group Resource 2
⋮
Group Resource m

FIG. 7

Node 1 Status — 810

Active/Inactive
Partition
Fail
Remove Pending
Start Pending
Undo Information

FIG. 8

APPARATUS AND METHOD FOR PROCESSING A TASK IN A CLUSTERED COMPUTING ENVIRONMENT

RELATED APPLICATION

This patent application is a continuation-in-part of Ser. No. 09/421,585 entitled "Apparatus and Method for Passively Monitoring Liveness of Jobs in a Clustered Computing Environment", filed on Oct. 20, 1999, which is incorporated herein by reference.

BACKGROUND OF THE INVENTION

1. Technical Field

This invention generally relates to data processing, and more specifically relates to the sharing of tasks between computers on a network.

2. Background Art

Since the dawn of the computer age, computer systems have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Networked computers are capable of performing tasks that no single computer could perform. In addition, networks allow low cost personal computer systems to connect to larger systems to perform tasks that such low cost systems could not perform alone. Most companies in the United States today have one or more computer networks. The topology and size of the networks may vary according to the computer systems being networked and the design of the system administrator. It is very common, in fact, for companies to have multiple computer networks. Many large companies have a sophisticated blend of local area networks (LANs) and wide area networks (WANs) that effectively connect most computers in the company to each other.

With multiple computers hooked together on a network, it soon became apparent that networked computers could be used to complete tasks by delegating different portions of the task to different computers on the network, which can then process their respective portions in parallel. In one specific configuration for shared computing on a network, the concept of a computer "cluster" has been used to define groups of computer systems on the network that can work in parallel on different portions of a task.

When different computers cooperate to perform a given task, it is desirable to have some fault-tolerance so the computers will know whether or not the task was successfully completed. One way to provide fault-tolerance is to have one of the computer systems act as a leader that monitors completion of the task by the different computers. However, providing a leader is a complex and problematic solution, and there is no guarantee that the leader will run without errors. Another way to provide fault-tolerance is to define global state data that resides in a data structure that may be accessed by any of the computer systems. This scheme allows all the participating computer systems to know if a failure occurs, but this requires some globally-accessible data store. However, accessing this store can result in substantial performance penalties for remote nodes because wide area networks (WANs) typically have poor performance. In addition, a globally-accessible data store provides a single point of failure. A globally-accessible data store also requires that all nodes recognize and have the capability to communicate with the data store (e.g., all nodes need a global file system, a compatible file system, etc.). Without a mechanism for providing improved fault-tolerance in a networked computing system, the computer industry will continue to suffer from known fault-tolerance mechanisms and methods that are excessively inefficient and complex.

DISCLOSURE OF INVENTION

According to the preferred embodiments, a clustered computer system includes multiple computer systems (or nodes) on a network that can become members of a group to work on a particular task. Each node includes group state data that represents the status of all members of the group. A group state data update mechanism in each node updates the group state data at acknowledge (ACK) rounds, so that all the group state data in all nodes are synchronized and identical if all members respond properly during the ACK round. Each node also includes a main thread and one or more work threads. The main thread receives messages from other computer systems in the group, and routes messages intended for the work thread to either a response queue or a work queue in the work thread, depending on the type of the message. If the message is a response to a currently-executing task, the message is placed in the response queue. Otherwise, the message is placed in the work queue for processing at a later time.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 7 is a block diagram of one sample implementation of the group state data of FIG. 3;

FIG. 8 is a block diagram of one sample implementation of the node I status showing information of FIG. 7;

BEST MODE FOR CARRYING OUT THE INVENTION

The present invention is accomplished through sharing portions of tasks on computers that are connected on a network. For those who are not familiar with networking concepts, the brief overview below provides background information that will help the reader to understand the present invention.

1. Overview

Networked Computer Systems

Connecting computers together on a network requires some form of networking software. Over the years, the power and sophistication of networking software has greatly increased. Networking software typically defines a protocol for exchanging information between computers on a network. Many different network protocols are known in the art. Examples of commercially-available networking software is Novell Netware and Windows NT, which each implement different protocols for exchanging information between computers.

One significant computer network that has recently become very popular is the Internet. The Internet grew out of a proliferation of computers and networks, and has evolved into a sophisticated worldwide network of computer systems. Using the Internet, a user may access computers all over the world from a single workstation. TCP/IP (Transmission Control Protocol/Internet Protocol) is an example of a network protocol that is in wide use today for communicating between computers on the Internet. In addition, the use of TCP/IP is also rapidly expanding to more local area networks (LANs) and Intranets within companies.

Computer Clusters

The prior art recognized the benefit of having groups of computer systems work on different pieces of a problem. The concept of "clusters" of computers evolved to include a predefined group of networked computers that can share portions of a larger task. One specific implementation of a cluster uses ordered messages for communicating between the computers in a cluster. In an ordered message system, each message is communicated to all nodes, and the order of messages is enforced so that all nodes see the messages in the same order.

Figure 1:
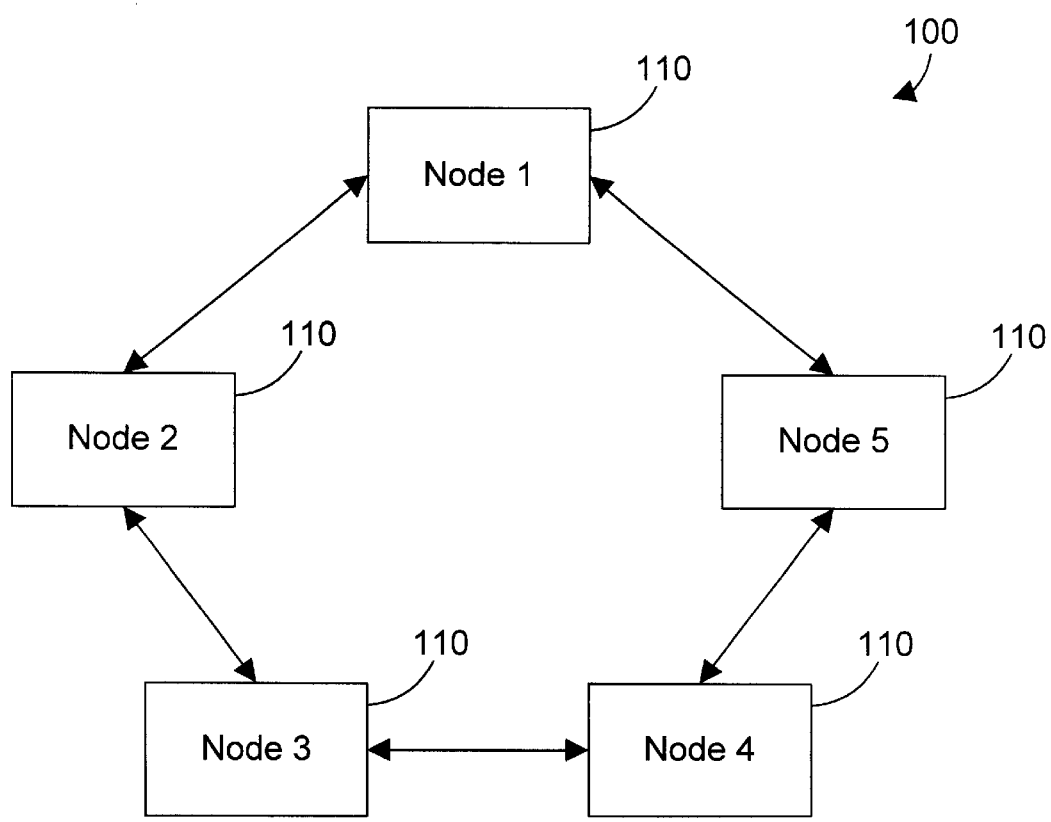
FIG. 1 is a block diagram of computer systems that may intercommunicate on a network.
Figure 2:
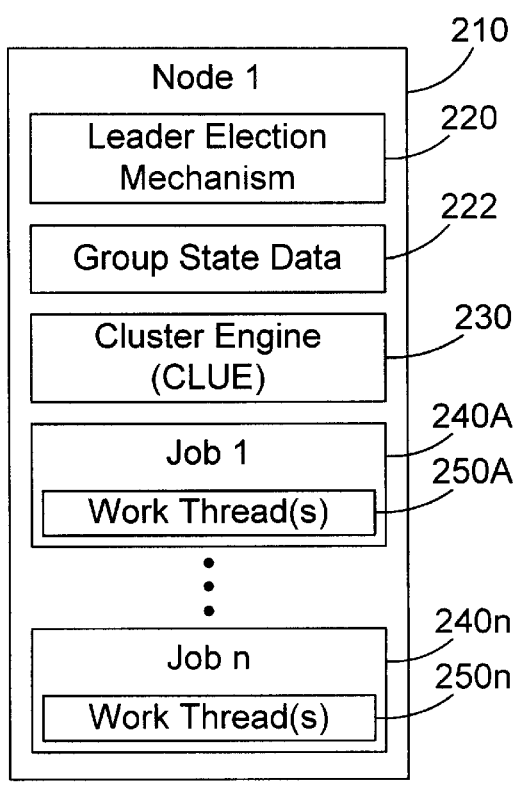
FIG. 2 is a block diagram of a prior art cluster node that includes a leader election mechanism and group state data.

Referring to FIG. 1, a simple cluster 100 of five computer systems (or "nodes") 110 is shown. The connections between these nodes represents a logical connection, and the physical connections can vary within the scope of the preferred embodiments so long as the nodes in the cluster can logically communicate with each other. Within a cluster, one or more "groups" may be defined, which correspond to logical groupings of nodes that cooperate to accomplish some task. Each node in a group is said to be a "member" of that group. As shown in FIG. 2, each node 210 in a prior art cluster includes a leader election mechanism 220, group state data 222, a cluster engine 230 (referred to herein as CLUE), and one or more jobs 240. Each job 240 includes one or more work threads 250 that execute the job 240, which amounts to a portion of the larger task that is being delegated to the members of the group.

Leader election mechanism 220 represents any suitable mechanism for electing one member of the group as a leader. In the prior art, electing a leader is one way to provide fault-tolerance. If a member of the group becomes unresponsive, the leader can then determine what actions to take in response to the fault. In order to track the state of a task as it is executed by the group, the leader maintains group state data 222 that indicates the status of all members of the group. This group state data 222 allows the leader to make informed decisions regarding how to recover from a fault. However, one problem with electing a leader is that the leader may become unresponsive, which defeats the purpose of electing a leader for fault-tolerance.

Another known way to provide fault-tolerance in a clustered computing environment uses the concept of global state data that can be accessed by all members of the group. A data structure contains the global state data, and if one member of the group fails, the global state data is read by the remaining members of the group to determine the state of the task that was being executed when the failure occurred. Providing a data structure that is accessible globally by all members of the group provides its own set of problems, and the system performance needed to maintain the global state data can result in significant performance penalties, particularly when the global state data is in a location that is remote from a given node. In addition, the global data structure provides a single point of failure, and requires that all nodes have compatible software for accessing the data structure.

CLUE 230 is a software process that enforces ordered messages between nodes in a cluster. All messages by any member of the group are communicated to the node's local CLUE 230, which then communicates the message to all other members of the group. When a job 240 wants to be part of a group, it registers with CLUE 230 as a member of that group. This registration causes CLUE to generate a membership change message to other members of the group to inform the other members of the new addition to the group. In similar fashion, when a job 240 no longer wants to become a member of the group, it unregisters with CLUE 230, which also causes a corresponding membership change message to inform the remaining members of the group that a member has been deleted from the group. When CLUE 230 receives a message from its member that is intended for the group, CLUE 230 sends the message to all registered members.

2. Detailed Description

According to a preferred embodiment of the present invention, an apparatus and method process a task in a clustered computing environment in a way that provide fault-tolerance by maintaining a local copy of the global state data in each node. Each node knows the work that every other node should perform between acknowledge (ACK) rounds, so each node can independently update its own copy of the global state data at the successful completion of an ACK round. The result is that all copies of the global state data in each node are synchronized to contain identical information at the successful completion of each ACK round. Because each node maintains the state of all other nodes in the group, the fault-tolerance of the system is greatly enhanced because a node can determine from its local copy of the global state data what actions to take in the event of a failure by any other member of the group.

Figure 3:
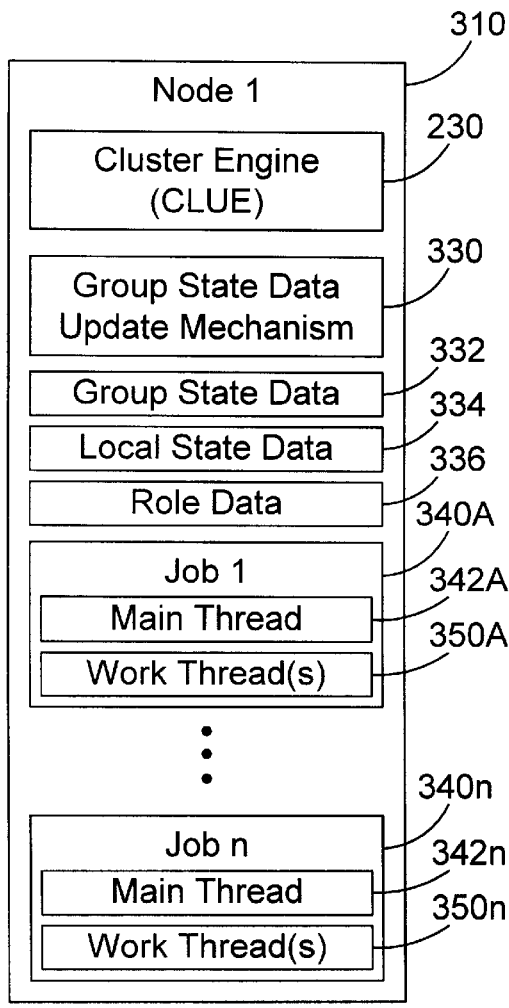
FIG. 3 is a block diagram of a node in accordance with the preferred embodiments.

Referring now to FIG. 3, a node 310 represents a node in a cluster, such as that shown in FIG. 1. Node 310 in accordance with the preferred embodiments includes a cluster engine (CLUE) 230, a group state data update mechanism 330, group state data 332, local state data 334, role data 336, and one or more jobs 340. Group state data update mechanism 330 is a software program that updates the group state data 332 at the successful completion of each ACK round, which is a specific type of synchronization event. Group state data 332 contains information regarding the state of all nodes in the group. Local state data 334 contains information regarding the status of resources that are local to the particular node. Role data 336 specifies the role of the node in performing the task. For example, role data 336 may specify that the node is a primary database for a task, or may specify that the node is a backup database for the task. The actions that the node takes in performing its jobs depend on its role as specified by the role data 336. Role data 336 is part of what makes a leader-less protocol possible. A requester can send a request message to a group through CLUE 230. The group then processes the request in due course. No leader election is necessary because each member knows what to do without something else telling it based on its role data 336.

Figure 4:
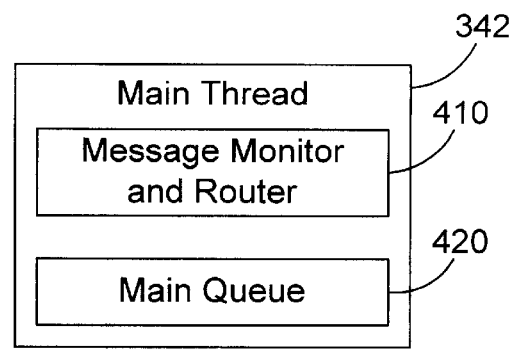
FIG. 4 is a block diagram of one sample implementation for the main thread in FIG. 3.

Each job 340 has one or more corresponding work threads 350. In addition, each job 340 also includes a single main thread 342. FIG. 4 illustrates one suitable implementation for main thread 342, which includes a message monitor and router 410 and a main queue 420. The main thread 342 does not do any work on the job 340, but is a supervisory mechanism that passes messages that it receives in its main queue 420 from CLUE 230 to the work thread(s). The message monitor and router 410 monitors all messages received from CLUE 230. If a message is a special type of message intended for the main thread 342, the main thread performs the required processing. For example, a special type of message may tell the job to kill a specified work thread, which causes main thread 342 to kill the specified work thread. If the main thread 342 kills a work thread 350, whether by request of the work thread or by some unrecoverable error that occurs in the work thread, main thread 342 may unregister with CLUE. By unregistering, all other members of the group know that the failing member is no longer a member of the group, and the remaining members can then process the error or take other appropriate action.

Figure 5:
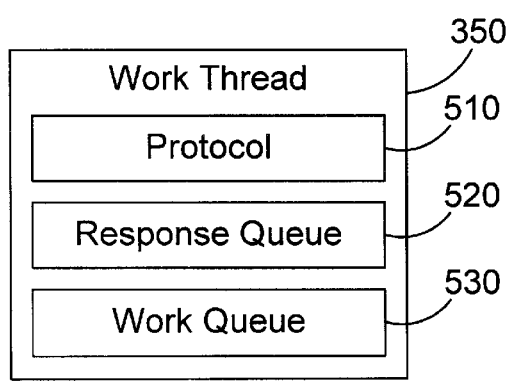
FIG. 5 is a block diagram of one sample implementation of a work thread in FIG. 3.

One suitable implementation of a work thread 350 in FIG. 3 is shown in FIG. 5. Work thread 350 is a thread of execution that actually performs the work of its corresponding job, as defined in a protocol 510. Protocol 510 is a task that is comprised of multiple phases that work thread 350 can perform. The present invention is made possible by defining certain characteristics of the main thread 342 and by defining certain characteristics of protocol 510.

For the preferred embodiments, the state of a group member depends on two conditions: 1) responsiveness; and 2) progress. Responsiveness means that a member is able to read group messages. Progress means working meaningfully on a protocol (e.g., not in an infinite wait or in an endless loop). If a group member is responsive and is making progress, then it presumed to be operating correctly.

The responsiveness of a group member is assured in the preferred embodiments by having a main thread 342 in each job 340. Main thread 342 performs limited functions that assure responsiveness. The main thread 342 only reads messages, forwards protocol messages to its work thread(s) 350, prioritizes messages as needed, and executes special messages, such as messages to terminate a work thread or to terminate the member job. No main thread can do any work that could lead to it not being available to read messages. This means that the main thread 342 cannot generate any ACK rounds, because waiting on an ACK round could result in the main thread being unavailable to read a message. In addition, the main thread 342 cannot wait to acquire a local resource, because waiting may also result in the main thread being unavailable to read a message. By defining the main thread in this manner, we know that the main thread will always be available to read a message, so the other group members need not be concerned that a sent message was not received by another member. This means that each member can send messages to the group without explicitly checking to see if the messages were received.

Figure 6:
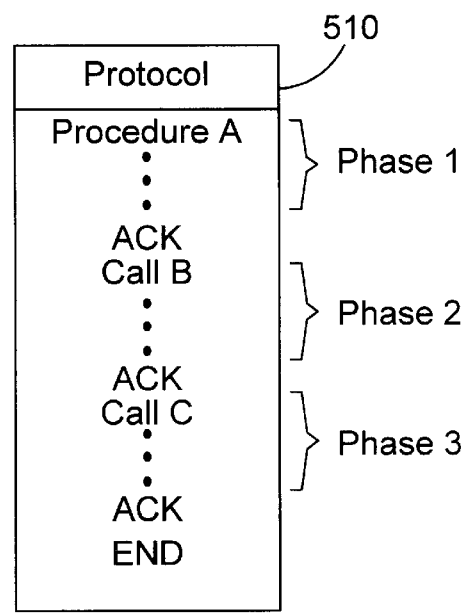
FIG. 6 is a block diagram of one sample implementation of the protocol that is executed by the work thread of FIG. 5.

Progress of a group member is assured by appropriately defining the structure of the protocol 510. Referring to FIG. 6, a protocol 510 in accordance with the preferred embodiments is divided into a number of different phases divided by ACK rounds. Each phase is defined in a way that assures that the member only does local work during a phase. When information is needed from another member, the information is sent through CLUE and is followed by an ACK round. The result is that progress is ensured between ACK rounds, and any failure during an ACK round will be communicated by the failing member either issuing a NACK response or unregistering with CLUE. CLUE guarantees that if a member fails to respond during an ACK round (and thus unregisters with CLUE), CLUE sends a special message known as a membership change to all members left in the group. The membership change is treated as a negative acknowledge (NACK) signal from the member that did not respond. In one embodiment, the remaining members in response to a NACK signal undo the changes that were made during execution of the protocol. In another embodiment, the remaining members may determine that the failure of the dead member is not significant, and may then continue processing the protocol.

In the preferred embodiments, each phase of protocol 510 is implemented in a different procedure (or code portion). Thus, as shown in FIG. 6, procedure A executes phase 1, followed by an ACK round. After the ACK round, procedure A calls procedure B, which executes phase 2, followed by another ACK round. After the second ACK round, procedure B calls procedure C, which executes phase 3, followed by another ACK round. After the third ACK round, procedure C continues processing the protocol to completion.

The nesting of phases as shown by way of example in FIG. 6 makes an "undo" function easier to perform. If a group member needs to "undo" its work on a protocol for some reason (such as a NACK from another group member or a membership change), each phase only has to undo what it did, without concern for what happened outside of it. This allows simpler code that is easier to follow, because what a phase does, it also undoes.

Because we know that the main thread 342 on each group member is always responsive, we know that each group member will receive and recognize a membership change. Because the work thread(s) only do local work between ACK rounds, the work thread will always progress to an ACK round (assuming no local deadlock), so each member is assured to see the membership change. Defining protocols such that only local work is done between ACK rounds means that a group member will always progress to an ACK round. Providing a main thread for each group member means that a group member will always be responsive. By assuring both progress and responsiveness in this manner, group members will simply unregister with CLUE if an error occurs, resulting in a membership change message from CLUE to remaining group members. This membership change is interpreted as an error condition, and job 340 can then determine from the group state data 332 what actions to take, if any, as a result of the failure.

Another advantage of the present invention is that checking the state of a group member is relatively straightforward because the member is guaranteed to progress to an ACK round. All other members in a group will know how far each other member has progressed in the protocol by virtue of knowing which ACK round(s) have occurred and by evaluating its local copy of the group state data 332, which describes the state of all nodes in the group. When an ACK round is successfully completed, the group state data update mechanism 330 updates the group state data 332 to reflect that each node successfully completed its job up to the most recent ACK round.

The group state data 332 in FIG. 3 can contain any suitable data relating to the state and status of the members of the group. One example of suitable group state data within the scope of the preferred embodiments is shown in FIG. 7. In this example, group state data 342 includes a table 710 that lists each node and its corresponding status, and also includes a resource list 720 that lists all resources on all nodes that are members of the group. The status for a particular node may contain any suitable information relating to the node. One example 810 of status for node 1 is shown in FIG. 8, and includes information regarding whether the node is active or inactive; information relating to whether a node is partitioned from other nodes; information that indicates when the node has failed; information that indicates when the node is about to be removed (remove pending); information that indicates when the node is about to become a member of the group (start pending); and any information that is needed should the protocol fail and the member needs to roll back (or undo) the changes it just made.

Figure 9:
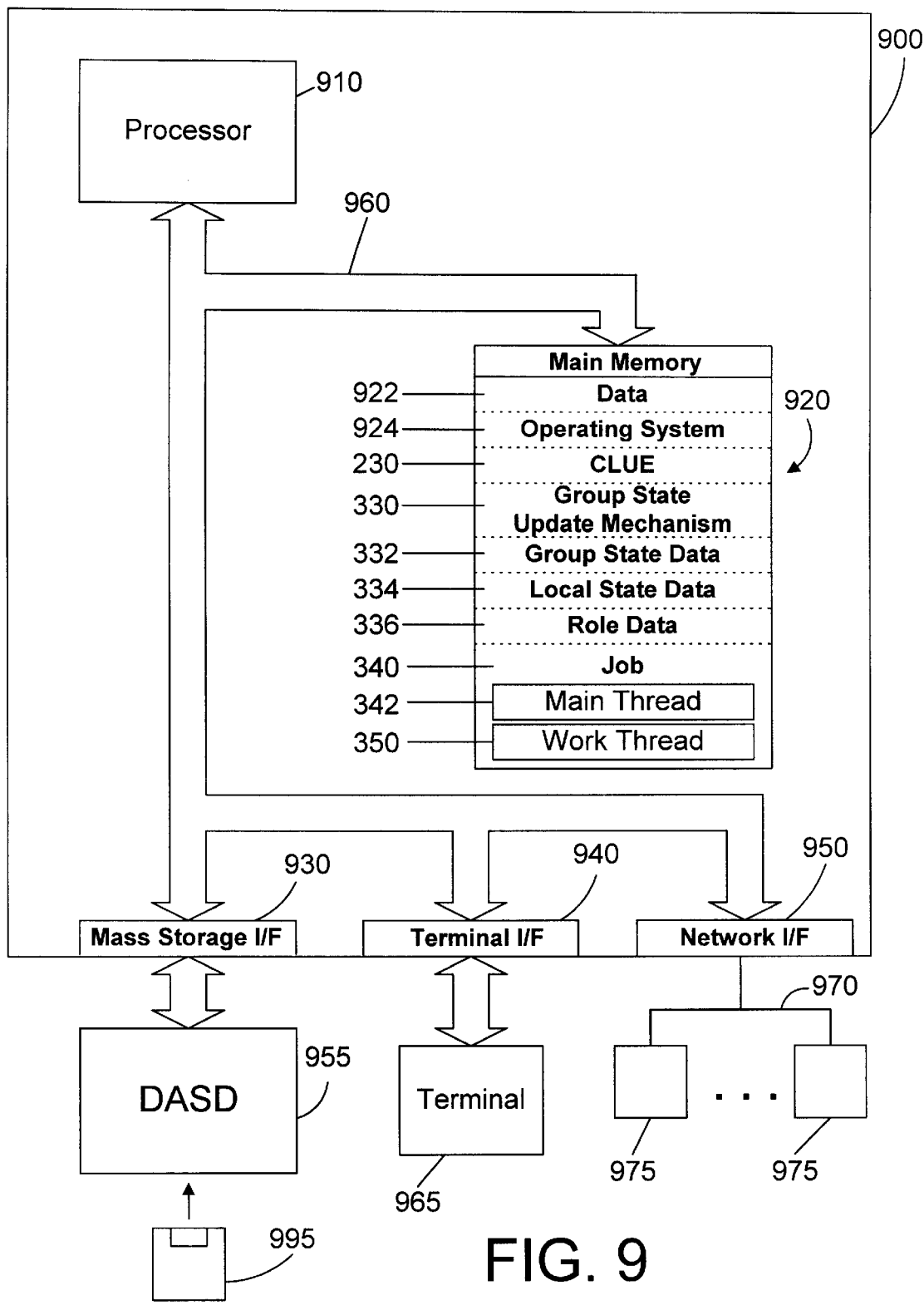
FIG. 9 is a block diagram of a computer system in accordance with the present invention that serves as a node in a cluster.

Referring now to FIG. 9, a computer system 900 is an enhanced IBM AS/400 computer system, and represents one suitable type of node 310 (FIG. 3) that can be networked together in accordance with the preferred embodiments. Those skilled in the art will appreciate that the mechanisms and apparatus of the present invention apply equally to any computer system that can be networked together with other computer systems. As shown in FIG. 9, computer system 900 comprises a processor 910 connected to a main memory 920, a mass storage interface 930, a terminal interface 940, and a network interface 950. These system components are interconnected through the use of a system bus 960. Mass storage interface 930 is used to connect mass storage devices (such as a direct access storage device 955) to computer system 900. One specific type of direct access storage device 955 is a floppy disk drive, which may store data to and read data from a floppy diskette 995.

Main memory 920 contains data 922, an operating system 924, a cluster engine (CLUE) 230, a group state data update mechanism 330, group state data 332, local state data 334, role data 336, and one or more jobs 340 that each contain a main thread 342 and one or more work threads 350. Data 922 represents any data that serves as input to or output from any program in computer system 900. Operating system 924 is a multitasking operating system known in the industry as OS/400; however, those skilled in the art will appreciate that the spirit and scope of the present invention is not limited to any one operating system. CLUE 230 is a cluster engine that communicates with other computer systems in a defined cluster. In the preferred embodiments, CLUE 230 enforces ordered messages, which means that each member in the cluster will see messages in the same order. In the preferred embodiments, CLUE 230 is a known cluster engine with functions as described above. However, it is equally within the scope of the present invention to provide a cluster engine 230 that has new or different attributes when compared to known cluster engines. The group state data 332, local state data 334, role data 336, and job 340 are all described above with reference to FIG. 3.

A job 340 can be a member of a group on a cluster that executes a defined protocol. Each job contains one main thread 342 and one or more work threads 350. The main thread 342 includes the features described above with reference to FIG. 4, and is defined to have no ACK rounds so it can never get stuck waiting on another member of the group. In addition, main thread 342 is defined in a way that assures it will never get stuck doing local work. This means, for example, that a main thread 342 cannot wait to acquire a local resource. The work thread(s) are described above with reference to FIG. 5. Each work thread executes a protocol 510 or a portion of a protocol 510, and communicates with the other group members (through the main thread 342 and CLUE 230) at ACK rounds defined in the protocol.

Computer system 900 utilizes well known virtual addressing mechanisms that allow the programs of computer system 900 to behave as if they only have access to a large, single storage entity instead of access to multiple, smaller storage entities such as main memory 920 and DASD device 955. Therefore, while data 922, operating system 924, CLUE 230, group state data update mechanism 330, group state data 332, local state data 334, role data 336, and jobs 340 are shown to reside in main memory 920, those skilled in the art will recognize that these items are not necessarily all completely contained in main memory 920 at the same time. It should also be noted that the term "memory" is used herein to generically refer to the entire virtual memory of computer system 900.

Processor 910 may be constructed from one or more microprocessors and/or integrated circuits. Processor 910 executes program instructions stored in main memory 920. Main memory 920 stores programs and data that processor 910 may access. When computer system 900 starts up, processor 910 initially executes the program instructions that make up operating system 924. Operating system 924 is a sophisticated program that manages the resources of computer system 900. Some of these resources are processor 910, main memory 920, mass storage interface 930, terminal interface 940, network interface 950, and system bus 960.

Although computer system 900 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 910. However, those skilled in the art will appreciate that the present invention applies equally to computer systems that simply use I/O adapters to perform similar functions.

Terminal interface 940 is used to directly connect one or more terminals 965 to computer system 900. These terminals 965, which may be non-intelligent (i.e., dumb) terminals or fully programmable workstations, are used to allow system administrators and users to communicate with computer system 900. Note, however, that while terminal interface 940 is provided to support communication with one or more terminals 965, computer system 900 does not necessarily require a terminal 965, because all needed interaction with users and other processes may occur via network interface 950.

Network interface 950 is used to connect other computer systems and/or workstations (e.g., 975 in FIG. 9) to computer system 900 across a network 970. Network 970 represents the logical connections between computer system 900 and other computer systems on the network 970. The present invention applies equally no matter how computer system 900 may be connected to other computer systems and/or workstations, regardless of whether the network connection 970 is made using present-day analog and/or digital techniques or via some networking mechanism of the future. In addition, many different network protocols can be used to implement a network. These protocols are specialized computer programs that allow computers to communicate across network 970. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 995 of FIG. 9) and CD ROM, and transmission type media such as digital and analog communications links.

Figure 10:
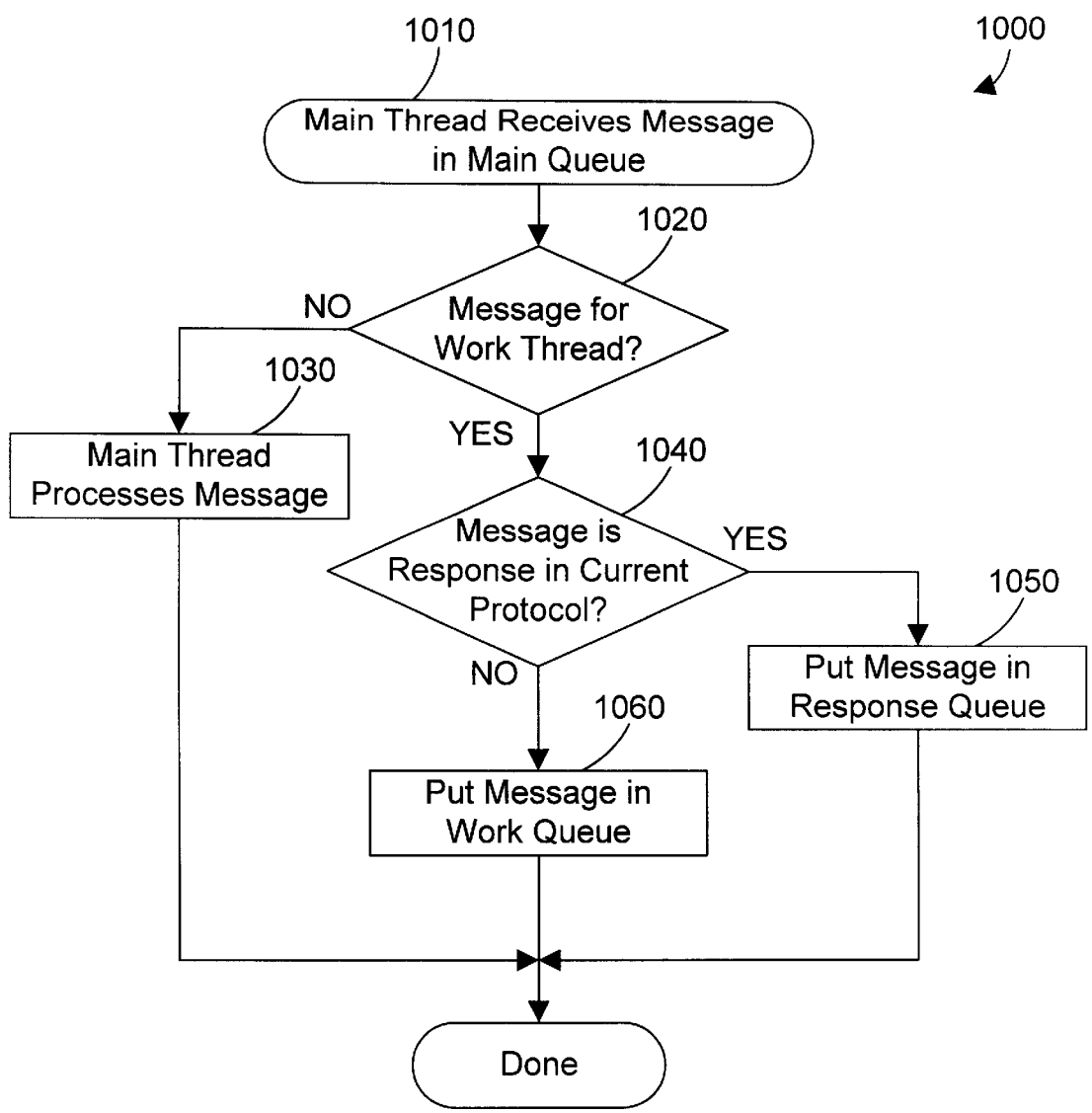
FIG. 10 is a flow diagram of a method in accordance with the preferred embodiments for handling messages received by the main thread.

Referring to FIG. 10, a method 1000 illustrates the steps a main thread 342 performs in processing a message received from CLUE 230. Method 1000 begins when the main thread 342 receives a message in its main queue 420. In the preferred embodiments, main queue 420 receives all messages from CLUE 230. If the received message is a message of a type that is processed by the main thread (step 1020=NO), the main thread processes the message (step 1030) without passing the message to the work thread 350. If the message is of a type that identifies the message as intended for the work thread (step 1020=YES), method 1000 next determines whether the message is in response to a currently-executing protocol, if any (step 1040). If the message is in response to a currently-executing protocol (step 1040=YES), the message is placed in the response queue 520 of the work thread 350 (step 1050). If the message is not in response to a currently-executing protocol, or if there is no protocol that is currently executing (step 1040= NO), the message is placed in the work queue 530 of the work thread 350. Referring again to FIG. 5, work thread 350, when executing a protocol, processes all message in its response queue until the protocol is complete. Once the protocol has been executed, work thread 350 retrieves from its work queue 530 the next protocol to execute. By sorting the messages into the response queue 520 and the work queue 530 depending on the type of message received, messages can now be processed out-of-order, but still remain in-order with respect to a protocol. Recall that CLUE 230 sends all message in order. It is possible for pending new requests to get intermixed with messages for the currently-executing protocol. By separating the messages to the two different queues, it looks to the currently-executing protocol like all of its messages have been sent in-order with no other messages intermixed. These separate queues make protocol code easier to design because the protocol need not be concerned with messages that do not directly pertain to it.

Figure 11:
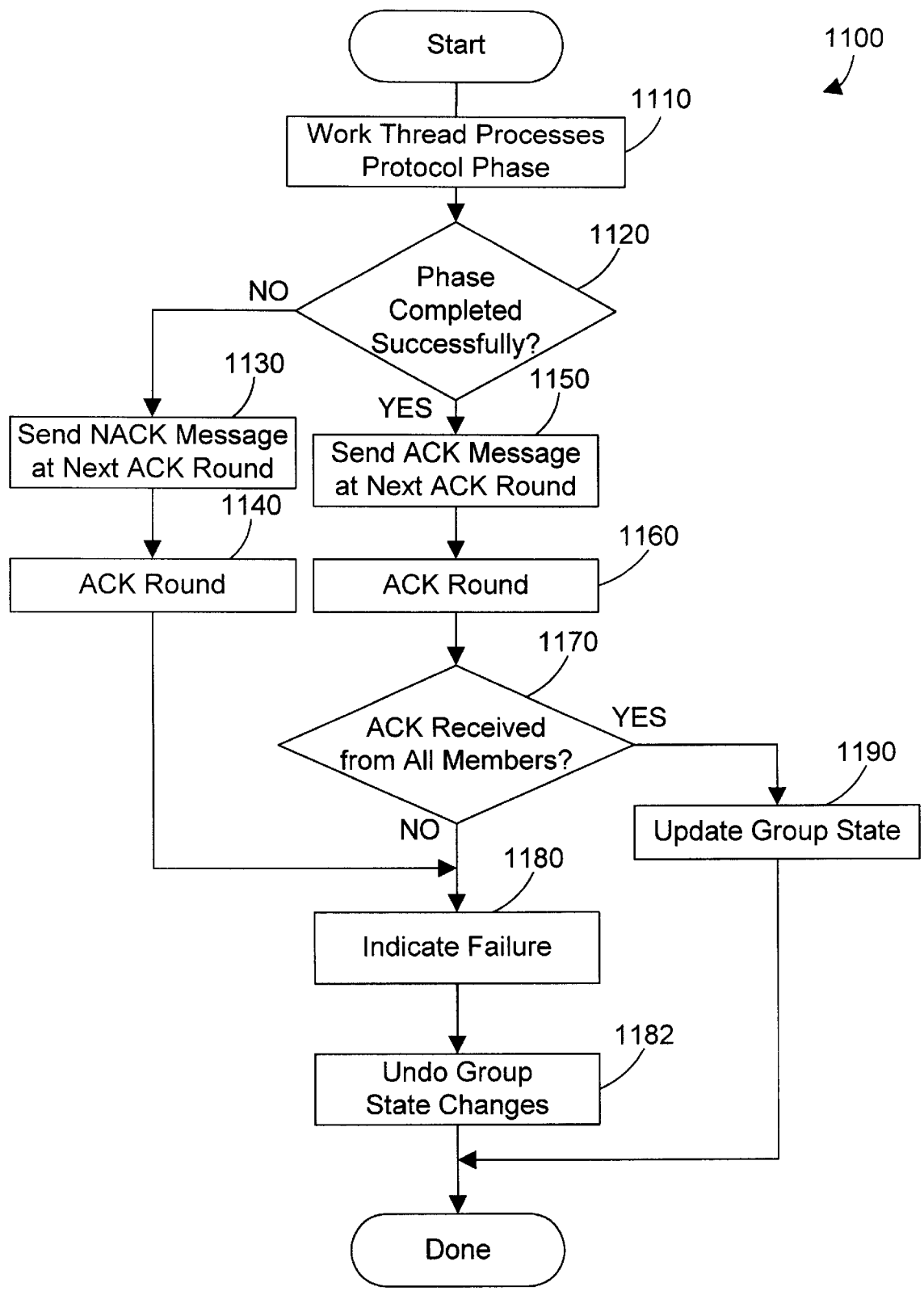
FIG. 11 is a flow diagram of a method in accordance with the preferred embodiments for updating the local copy of group state data on a node in a clustered computing environment.

Referring to FIG. 11, a method 1100 illustrates the steps that group state data update mechanism 330 (see FIG. 3) performs to update the group state data 332 in a node. We assume as a starting point that a work thread 350 is processing a phase in a protocol (step 1110) (see FIG. 6). If the work thread encounters an error in processing the protocol phase (step 1120=NO), it informs the other members of the group of the error by issuing a NACK (negative acknowledge) response 1130 at the next ACK round 1140. This effectively indicates a failure (step 1180) to the other members of the group. Note that instead of issuing a NACK signal, the node could unregister with CLUE, which would then perform a membership change in step 1180 to inform the other members of the group of the failing member. After indicating the failure in step 1180, each group member could then take appropriate action to undo the work it performed during the phase or during all phases in the protocol to the point of the failure (step 1182). If the work thread successfully completes the protocol phase in step 1110 (step 1120= YES), the work thread sends an ACK message (step 1150) at the next ACK round 160. If one of the members in the group responds with a NACK or does not respond during the ACK round due to the member unregistering from CLUE (step 1170=NO), a failure is indicated (step 1180). If an ACK is received from all members of the group (step 1170=YES), the group state data 332 in each node is updated (step 1190) to reflect the successful completion of the work up to and including the ACK round. Note that in the preferred embodiments, the group state data update mechanism 330 is identical code on all nodes, which assures that the group state data 332 is changed in the same manner on all nodes. This assures that the group state data 332 on each node is synchronized and identical after the update occurs following an ACK round.

The present invention as described with reference to the preferred embodiments herein provides significant improvements over the prior art. Each node in a cluster maintains a local copy of group state data. A group state data update mechanism in each node updates the node's local copy of the group state data upon the successful completion of an ACK round. Thus, when an error in processing the task is encountered, a node may interrogate its own local copy of the group state date to determine the state of other members of the group. This feature allows fault-tolerance without electing a leader or providing a global data store for group state data, and therefore overcomes the problems associated with these prior art solutions.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
 at least one processor;
 a memory coupled to the at least one processor;
 a cluster engine residing in the memory and executed by the at least one processor;
 a job residing in the memory and executed by the at least one processor, the job including:
  at least one work thread that performs at least one predefined task, the work thread including a response queue and a work queue; and
  a main thread that receives messages from at least one computer system coupled to the apparatus and that routes a message for the at least one work thread to one of the response queue and the work queue depending on the type of the message.

2. The apparatus of claim 1 wherein the at least one predefined task comprises a protocol that includes at least one acknowledge (ACK) round, and that performs only local processing between ACK rounds.

3. The apparatus of claim 1 wherein the main thread performs only local processing.

4. The apparatus of claim 1 wherein the main thread does not wait for any local resource, and thus is guaranteed to receive a message sent by the cluster engine.

5. The apparatus of claim 1 wherein the main thread routes the message to the response queue if the message is a response to a currently-executing task and wherein the main thread routes the message to the work queue if the message is not a response to a currently-executing task.

6. The apparatus of claim 1 further comprising group state data residing in the memory that reflects the state of each computer system in a cluster that includes the apparatus.

7. The apparatus of claim 6 further comprising a group state update mechanism residing in the memory that updates the group state data when a predefined portion of a task is completed successfully.

8. A networked computer system comprising:
   a cluster of computer systems that each includes:
      a network interface that couples each computer system via a network to other computer systems in the cluster;
      a memory;
      a cluster engine residing in the memory and executed by the at least one processor; and
      group state data residing in the memory that reflects the state of each computer system in the cluster, wherein the group state data for one computer system in the cluster is updated to be identical to the group state data in all computer systems in the cluster after a synchronization event occurs.

9. The networked computer system of claim 8 further comprising role data residing in the memory that indicates the role for the computer system in tasks executed by the computer systems in the cluster.

10. The networked computer system of claim 8 further comprising a group state update mechanism residing in the memory that updates the group state data when a predefined portion of a task is completed successfully.

11. The networked computer system of claim 8 wherein the synchronization event comprises an acknowledge (ACK) round.

12. A computer-implemented method for processing a task using a plurality of jobs that form a group in a clustered computing environment, the method comprising the steps of:
   providing a cluster engine for each member of the group that communicates with the other cluster engines in the group;
   providing at least one work thread for each job that executes the task, the at least one work thread including a response queue and a work queue;
   providing a main thread for each job, the main thread performing the steps of:
      receiving messages from other members of the group via the cluster engine corresponding to the main thread;
      routing a message for the at least one work thread to one of the response queue and the work queue depending on the type of the message.

13. The method of claim 12 wherein the task comprises a protocol that includes at least one acknowledge (ACK) round, and that performs only local processing between ACK rounds.

14. The method of claim 12 wherein the main thread performs only local processing.

15. The method of claim 12 wherein the main thread does not wait for any local resource, and thus is guaranteed to receive a message sent by the cluster engine.

16. A computer-implemented method for processing a task using a plurality of jobs that form a group in a computing environment that includes a cluster of computer systems, the method comprising the steps of:
   providing a cluster engine for each member of the group that communicates with the other cluster engines in the group;
   providing group state data in each computer system;
   processing the plurality of jobs; and
   during the processing of the plurality of jobs, updating the group state data in each of the computer systems in the cluster so that the group state data in all computer systems in the cluster contain the same information after a synchronization event occurs.

17. The method of claim 16 wherein the synchronization event comprises an acknowledge (ACK) round.

18. A program product comprising:
   (A) a computer program comprising:
      at least one work thread that performs at least one predefined task, the work thread including a response queue and a work queue;
      a main thread that receives messages from at least one computer system and that routes a message for the at least one work thread to one of the response queue and the work queue depending on the type of the message; and
   (B) computer-readable signal bearing media bearing the computer program.

19. The program product of claim 18 wherein the signal bearing media comprises recordable media.

20. The program product of claim 18 wherein the signal bearing media comprises transmission media.

21. The program product of claim 18 wherein the at least one predefined task comprises a protocol that includes at least one acknowledge (ACK) round, and that performs only local processing between ACK rounds.

22. The program product of claim 18 wherein the main thread performs only local processing.

23. The program product of claim 18 wherein the main thread does not wait for any local resource, and thus is guaranteed to receive a message sent by the cluster engine.

24. The program product of claim 18 wherein the main thread routes the message to the response queue if the message is a response to a currently-executing task and wherein the main thread routes the message to the work queue if the message is not a response to a currently-executing task.

25. The program product of claim 18 wherein the computer program further comprises group state data that reflects the state of each computer system in a cluster that includes the apparatus.

26. The program product of claim 25 wherein the computer program further comprises a group state update mechanism that updates the group state data when a predefined portion of a task is completed successfully.

27. A program product comprising:
   (A) a computer program comprising:
      at least one work thread that performs a predefined protocol that includes at least one synchronization event;
      a main thread that registers with a cluster engine to become a member of a group of jobs that execute on a plurality of computer systems, that receives messages from at least one of the plurality of computer systems, and that routes appropriate messages from the at least one computer system to the at least one work thread;

a group state update mechanism that updates group state data that reflects status information relating to each member of the group, the group state update mechanism updating the group state data upon the occurrence of the synchronization event; and (B) computer-readable signal bearing media bearing the computer program.

28. The program product of claim 27 wherein the signal bearing media comprises recordable media.

29. The program product of claim 27 wherein the signal bearing media comprises transmission media.

30. The program product of claim 27 wherein the computer program further comprises a group state update mechanism that updates the group state data when a predefined portion of a task is completed successfully.

31. The program product of claim 27 wherein the synchronization event comprises an acknowledge (ACK) round.

* * * * *